United States Patent
Zhu et al.

(10) Patent No.: US 9,197,301 B2
(45) Date of Patent: Nov. 24, 2015

(54) METHOD AND APPARATUS FOR CONFIGURING TRANSMISSION MODE

(71) Applicant: Huawei Technologies Co., Ltd., Shenzhen, Guangdong (CN)

(72) Inventors: Xiaolong Zhu, Shanghai (CN); Chao Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/306,921

(22) Filed: Jun. 17, 2014

(65) Prior Publication Data

US 2014/0294115 A1    Oct. 2, 2014

Related U.S. Application Data

(63) Continuation of application No. PCT/CN2012/073799, filed on Apr. 11, 2012.

(51) Int. Cl.
*H04B 7/02* (2006.01)
*H04B 7/04* (2006.01)
*H04B 7/06* (2006.01)
(Continued)

(52) U.S. Cl.
CPC ............ *H04B 7/0456* (2013.01); *H04B 7/0617* (2013.01); *H04B 7/0639* (2013.01); *H04B 7/0689* (2013.01); *H04B 17/26* (2015.01); *H04B 17/391* (2015.01)

(58) Field of Classification Search
CPC .............. H04B 7/02; H04L 1/02; H04L 1/06; H04L 1/04
USPC ................................................... 375/267, 299
See application file for complete search history.

(56) References Cited

U.S. PATENT DOCUMENTS

| | | | | |
|---|---|---|---|---|
| 6,985,752 | B2 * | 1/2006 | Takano | H04L 1/0009 370/335 |
| 7,593,486 | B2 * | 9/2009 | Jeong | H04B 7/0689 375/260 |
| 8,098,752 | B2 * | 1/2012 | Hwang | H04B 7/0417 370/310 |

(Continued)

FOREIGN PATENT DOCUMENTS

| | | |
|---|---|---|
| CN | 101388699 A | 3/2009 |
| CN | 101505205 A | 8/2009 |

(Continued)

*Primary Examiner* — Emmanuel Bayard
(74) *Attorney, Agent, or Firm* — Leydig, Voit & Mayer, Ltd.

(57) ABSTRACT

Embodiments of the present invention provide a method and an apparatus for configuring a transmission mode, where the method includes: obtaining channel matrix information, where the channel matrix information is any one of the following: a precoding matrix indicator which most matches a current uplink channel matrix of a terminal, a current downlink precoding matrix indicator of the terminal, an uplink channel matrix of the terminal and the precoding matrix indicator which most matches the current uplink channel matrix of the terminal, and the uplink channel matrix of the terminal and the current downlink precoding matrix indicator of the terminal; determining performance of data transmission performed by adopting a closed-loop mode and an open-loop mode according to the channel matrix information, and selecting the data transmission mode according to the determined performance of data transmission, where the data transmission mode includes the open-loop mode, the closed-loop mode.

16 Claims, 1 Drawing Sheet

(51) Int. Cl.
*H04B 17/26* (2015.01)
*H04B 17/391* (2015.01)

(56) References Cited

U.S. PATENT DOCUMENTS

| | | | | |
|---|---|---|---|---|
| 8,103,306 | B2 * | 1/2012 | Iwamura | H04W 36/0083 455/161.1 |
| 8,144,797 | B2 * | 3/2012 | Mujtaba | H04B 7/0417 375/267 |
| 8,160,601 | B2 * | 4/2012 | Veselinovic | H04L 1/0001 370/232 |
| RE44,320 | E * | 6/2013 | Sawai | H04L 1/0002 375/267 |
| 8,553,637 | B2 * | 10/2013 | Adhikari | H04L 1/0025 370/329 |
| 8,611,453 | B2 * | 12/2013 | Mujtaba | H04B 7/0417 375/267 |
| 8,755,810 | B2 * | 6/2014 | Tan | H04B 7/0486 375/224 |
| 8,913,574 | B2 * | 12/2014 | Chen | H04B 7/0417 370/329 |
| 8,971,272 | B2 * | 3/2015 | Kim | H04B 7/024 370/329 |
| 2005/0243942 | A1 * | 11/2005 | Sawai | H04L 1/0002 375/267 |
| 2005/0281221 | A1 * | 12/2005 | Roh | H04B 7/0689 370/328 |
| 2009/0034639 | A1 | 2/2009 | Hwang et al. | |
| 2010/0222003 | A1 * | 9/2010 | Yoshii | H04W 72/082 455/63.3 |
| 2010/0284351 | A1 | 11/2010 | Liang et al. | |
| 2011/0026617 | A1 * | 2/2011 | Lee | H04L 27/2607 375/260 |
| 2012/0173247 | A1 * | 7/2012 | Sung | G10L 19/04 704/500 |
| 2012/0275531 | A1 | 11/2012 | Wu et al. | |
| 2013/0058246 | A1 | 3/2013 | Li et al. | |
| 2013/0185062 | A1 * | 7/2013 | Krishnan | G10L 19/04 704/219 |

FOREIGN PATENT DOCUMENTS

| | | |
|---|---|---|
| CN | 101640561 A | 2/2010 |
| CN | 102122976 A | 7/2011 |
| CN | 102244566 A | 11/2011 |
| EP | 2169846 A1 | 3/2010 |
| EP | 2182650 A1 | 5/2010 |
| WO | WO 2011123976 A1 | 10/2011 |

* cited by examiner

METHOD AND APPARATUS FOR CONFIGURING TRANSMISSION MODE

CROSS-REFERENCE TO RELATED APPLICATIONS

This application is a continuation of International Patent Application No. PCT/CN2012/073799, filed on Apr. 11, 2012, which is hereby incorporated by reference in its entirety.

FIELD OF THE INVENTION

The present invention relates to the field of communications technologies, and in particular, to a method and an apparatus for configuring a transmission mode.

BACKGROUND OF THE INVENTION

An apparatus with an emission function in an application scenario configured with multiple antennas, such as a base station and a terminal in a multiple input multiple output (MIMO) communication system, often adopts a precoding technology to obtain higher transmission efficiency.

Taking downlink data transmission as an example, when performing data transmission, the base station and the terminal use a precoding matrix, and according to an obtaining manner of the precoding matrix, transmission may be further divided into an open-loop precoding transmission mode and a closed-loop precoding transmission mode. The open-loop precoding transmission mode is generally referred to as an open-loop mode for short, and in the open-loop mode, the base station selects the precoding matrix by itself and the terminal does not need to feed back the precoding matrix; and the closed-loop precoding transmission mode is generally referred to as a closed-loop mode for short, and in the closed-loop mode, the terminal needs to feed back the precoding matrix, and the base station selects the precoding matrix in combination with the feedback of the terminal.

In the closed-loop mode, a delay exists when the terminal feeds back the precoding matrix, so the movement speed of the terminal has large influence on performance of the closed-loop mode. Comparing the performance that can be reached in the open-loop mode and in the closed-loop mode, it is often considered that the higher the speed is, the better the performance that can be reached by the open-loop mode is, and on the contrary, the lower the speed is, the better the performance that can be reached by the closed-loop mode is. Therefore, in order to obtain better performance, a generally adopted solution is to determine whether to adopt the open-loop mode or the closed-loop mode according to the movement speed, which is specifically: when the movement speed is low, the closed-loop mode is adopted, and when the movement speed is medium or high, the open-loop mode is adopted.

In the conventional art, in the case of determining a transmission mode merely according to the movement speed of the terminal, the data transmission efficiency is low.

SUMMARY OF THE INVENTION

Embodiments of the present invention provide a method and an apparatus for configuring a transmission mode, which may promote data transmission efficiency.

A method for configuring a transmission mode includes:

obtaining a measured value and a preset value, where the measured value includes: a current movement speed of a terminal and current channel correlation of the terminal; and selecting a data transmission mode according to a result of comparing the measured value and the preset value, where the data transmission mode includes an open-loop mode, a closed-loop mode.

A method for configuring a transmission mode includes:

obtaining channel matrix information, where the channel matrix information is any one of a precoding matrix indicator which most matches a current uplink channel matrix of a terminal, a current downlink precoding matrix indicator of the terminal, an uplink channel matrix of the terminal and the precoding matrix indicator which most matches the current uplink channel matrix of a terminal, and the uplink channel matrix of the terminal and the current downlink precoding matrix indicator of the terminal; and determining, according to the channel matrix information, performance of data transmission performed by adopting a closed-loop mode and an open-loop mode, and selecting a data transmission mode according to the determined performance of data transmission, where the data transmission mode includes the open-loop mode, the closed-loop mode.

An apparatus for configuring a transmission mode includes:

a parameter obtaining unit, configured to obtain a measured value and a preset value, where the measured value includes a current movement speed of a terminal and current channel correlation of the terminal; and a first selecting unit, configured to select a data transmission mode according to a result of comparing the measured value and the preset value, where the data transmission mode includes an open-loop mode, a closed-loop mode.

An apparatus for configuring a transmission mode includes:

an information obtaining unit, configured to obtain channel matrix information, where the channel matrix information is any one of a precoding matrix indicator which most matches a current uplink channel matrix of a terminal, a current downlink precoding matrix indicator of the terminal, an uplink channel matrix of the terminal and the precoding matrix indicator which most matches the current uplink channel matrix of the terminal, and the uplink channel matrix of the terminal and the current downlink precoding matrix indicator of the terminal; and a second selecting unit, configured to determine, according to the channel matrix information, performance of data transmission performed by adopting a closed-loop mode and an open-loop mode, and select a data transmission mode according to the determined performance of data transmission, where the data transmission mode includes the open-loop mode, the closed-loop mode.

It can be seen from the above technical solutions that, in the embodiments of the present invention, a transmission mode is determined by adopting channel spatial correlation and a speed, so as to select the transmission mode more accurately, thereby promoting data transmission efficiency.

BRIEF DESCRIPTION OF THE DRAWINGS

To illustrate the technical solutions in the embodiments of the present invention more clearly, the following briefly describes the accompanying drawings required for describing the embodiments. Apparently, the accompanying drawings in the following descriptions merely show some of the embodiments of the present invention, and persons of ordinary skill in the art can derive other drawings from these accompanying drawings without creative efforts.

DETAILED DESCRIPTION OF THE EMBODIMENTS

To make the objectives, technical solutions, and advantages of the present invention more comprehensible, the following further describes the present invention with reference to the accompanying drawings. Apparently, the embodiments described herein are merely a part rather than all of the embodiments of the present invention. All other embodiments obtained by persons of ordinary skill in the art based on the embodiments of the present invention without creative effects shall fall within the protection scope of the present invention.

In the process of implementing the embodiments of the present invention, the inventor finds that: comparing performance that can be reached in an open-loop mode and performance that can be reached in a closed-loop mode, the performance is also closely related to channel spatial correlation besides related to a movement speed. An open-loop precoding transmission mode is generally referred to as an open-loop mode for short. In the open-loop mode, a base station selects a precoding matrix in a certain manner by itself, and the open-loop mode has high robustness to the channel characteristic change between a base station and a terminal. A closed-loop precoding transmission mode is generally referred to as a closed-loop mode for short. In the closed-loop mode, a terminal selects a most suitable precoding matrix according to channel state information, and then feed it back to a base station for use. Because the feedback has a delay, the performance of the closed-loop mode is sensitive to the channel characteristic change between the base station and the terminal. For example, in a two sent two received long term evolution (Long Term Evolution, LTE) downlink system, it is often assumed that in the environment of low channel correlation, it is considered that when the speed is relatively high (such as 30 km/h), the performance of the open-loop mode is better than the performance of the closed-loop mode. However, when the correlation is relatively high, even if the speed is very high (such as 120 km/h), the performance of the closed-loop mode may also be better than the performance of the open-loop mode. Besides, it should be noted that in the following embodiments of the present invention, the situation of a matrix from a set most matches a specific matrix is a condition that an inner product between the two matrices corresponds to a highest value. Further, the situation of a precoding matrix indicator most matches an uplink channel matrix is a condition that an inner product between a precoding matrix indicated by the precoding matrix indicator and the uplink channel matrix corresponds to a highest value.

Figure 1:
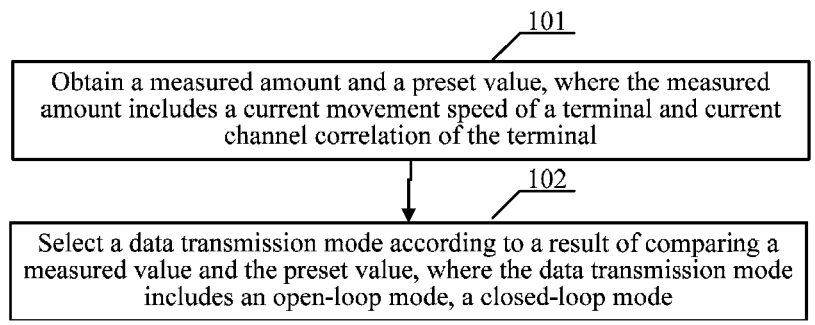
FIG. 1 is a schematic flow chart of a method for configuring a transmission mode according to an embodiment of the present invention.

An embodiment of the present invention provides a method for configuring a transmission mode, as shown in FIG. 1, including:

101: Obtain a measured value and a preset value, where the measured value includes a current movement speed of a terminal and the current channel correlation of the terminal.

An execution subject of this embodiment may be any apparatus with a requirement of selecting a transmission mode. Therefore, in 101, a method for obtaining the current movement speed of the terminal and the current channel spatial correlation of the terminal may be: obtaining, by a base station, the movement speed and the channel spatial correlation of the terminal; or receiving, by the base station, the movement speed and the channel spatial correlation of the terminal sent by the terminal; or obtaining, by the base station, one of the movement speed and the channel spatial correlation of the terminal, and receiving the other of the movement speed and the channel spatial correlation of the terminal sent by the terminal.

This embodiment also provides an example of the method for obtaining the movement speed and the channel spatial correlation of the terminal.

The obtaining the movement speed of the terminal includes: when a sounding reference signal is sent, obtaining an uplink channel matrix through estimation, calculating the time domain auto-correlation of the time-adjacent uplink channel matrices estimated twice, obtaining a Doppler frequency by calculating a time interval of estimating two adjacent channel matrices in sequence and the time domain auto-correlation of the uplink channel matrices, and obtaining the movement speed of the terminal according to the conversion relationship between the Doppler frequency and the speed.

More specifically, taking an LTE system as an example, each time when a sounding reference signal (Sounding Reference Signal, SRS) is sent, an uplink channel matrix H is estimated, the time domain auto-correlation of the adjacent twice estimated channel matrices is calculated, which is assumed to be R. According to a time correlation theory, $R=J0(2\pi fd\tau)$, where $J0(*)$ is a zero-order Bessel function, fd is the Doppler frequency, and $\tau$ is the time interval of estimating two adjacent channel matrices in sequence. According to the formula, the Doppler frequency fd may be calculated, and according to the conversion relationship between the Doppler frequency and the speed, the movement speed may be obtained.

The obtaining the channel spatial correlation includes: when the sounding reference signal is sent, obtaining the uplink channel matrix through estimation, a receive correlation matrix is estimated through mathematical expectation and the conjugate transpose of the uplink channel matrix, to obtain the information of the channel spatial correlation.

More specifically, taking the LTE system as an example, each time when the SRS is sent, an uplink channel matrix H is estimated, and then according to a formula Rrx=E [H*HH], the receive correlation matrix is estimated, that is, the information of the channel spatial correlation may be obtained. E[*] denotes the mathematical expectation operator and HH is the conjugate transpose of the matrix.

There are many optional solutions for the preset value, and in the embodiment of the present invention, three types of solutions are taken as examples to illustrate, which are: the preset value is a speed threshold and a channel correlation threshold; the preset value is a value of a speed function; and the preset value is a value of a channel correlation function.

102: Select a data transmission mode according to a result of comparing the measured value and the preset value, where the data transmission mode includes an open-loop mode, a closed-loop mode. After the data transmission mode is selected, data transmission may be performed according to the selected mode.

In the embodiment of the present invention, a transmission mode is determined by adopting channel spatial correlation and a speed, so as to select the transmission mode more accurately, thereby promoting data transmission efficiency.

If the preset value is the speed threshold and the channel correlation threshold, in 102, the selecting the data transmission mode according to the result of comparing the measured value and the preset value includes any one of the following: if the current movement speed of the terminal is greater than the speed threshold, and the current channel correlation of the terminal is smaller than the channel correlation threshold, selecting the open-loop mode to be the data transmission mode; if the current movement speed of the terminal is smaller than the speed threshold or the current channel correlation of the terminal is greater than the channel correlation threshold, selecting the closed-loop mode to be the data transmission mode.

If the preset value is a value of the speed function, an independent variable of the speed function is the channel spatial correlation, and the speed function is a monotone increasing function; the value of the speed function is a function value of the speed function when the independent variable value of the speed function is a value of the current channel spatial correlation of the terminal; then in 102, according to the result of comparing the measured value and the preset value, the selecting the data transmission mode includes any one of the following: if the current movement speed of the terminal is greater than the value of the speed function, selecting the open-loop mode to be the data transmission mode; if the current movement speed of the terminal is smaller than the value of the speed function, selecting the closed-loop mode to be the data transmission mode.

If the preset value is a value of the channel correlation function, the independent variable of the channel correlation function is the movement speed, and the channel correlation function is a monotone increasing function; the value of the channel correlation function is the function value of the channel correlation function when the independent variable value of the channel correlation function is the value of the current movement speed of the terminal; then in 102, according to the result of comparing the measured value and the preset value, the selecting the data transmission mode includes any one of the following: if the current channel spatial correlation of the terminal is smaller than the value of the channel correlation function, selecting the open-loop mode to be the data transmission mode; if the current channel spatial correlation of the terminal is greater than the value of the channel correlation function, selecting the closed-loop mode to be the data transmission mode.

Optionally, in the embodiment, by taking computer simulation as an example, the methods for determining the speed threshold, the channel correlation threshold, the speed function and the channel correlation function may include the following three steps.

1. Discretization of the independent variables (the speed and the channel correlation): values in a speed range and a channel correlation range are taken at intervals as sample points respectively.

The discretization for example: for a common speed range (0-200 km/h), points Vi are taken at an interval of 10 km/h, and 21 points are taken in total; and for a channel correlation range (0-1), points Aj are taken at an interval of 0.1, and 11 points are taken in total. In this way, a series of two-dimensional independent variables (the speed Vi, the channel correlation Aj) are obtained, and which are 21*11=231 groups in total.

2. Obtain data transmission throughput in the closed-loop mode corresponding to each sample point and in the open-loop mode corresponding to the each sample point, through simulation.

Simulation: for each group of independent variables, the data transmission throughput in the closed-loop mode and the open-loop mode in the environment is simulated.

3. According to the independent variables and the throughput, determine the speed threshold, the channel correlation threshold, the speed function and the channel correlation function. The method for determining the speed threshold and the channel correlation threshold, the method for determining the speed function, and the method for determining the channel correlation function each are illustrated as follows:

(1) The Speed Threshold and the Channel Correlation Threshold

The speed threshold is a speed value corresponding to a maximum sample point when the data transmission throughput in the closed-loop mode corresponding to all the sample points in the channel correlation range is greater than the data transmission throughput in the open-loop mode corresponding to all the sample points in the channel correlation range. That is, a speed value corresponding to a maximum speed sample point that satisfies a condition (in any channel correlation, the data transmission throughput in the closed-loop mode is greater than the data transmission throughput in the open-loop mode) is selected as the speed threshold.

The channel correlation threshold is channel correlation corresponding to a minimum sample point when the data transmission throughput in the closed-loop mode corresponding to all the sample points in the speed range is greater than the data transmission throughput in the open-loop mode corresponding to all the sample points in the speed range. That is, a value corresponding to a minimum correlation sample point that satisfies a condition (in any speed, the data transmission throughput in the closed-loop mode is greater than the data transmission throughput in the open-loop mode) is selected as the correlation threshold.

(2) The Speed Function

For each sample point Aj of the channel correlation range, the maximum speed $V(Aj)$ when the data transmission throughput in the closed-loop mode is higher than the data transmission throughput in the open-loop mode is obtained, so as to obtain a group of discrete points $(Aj, V(Aj))$. The speed function is that: when $Aj <= A < Aj+1$ and $j \in [1, m]$, $V=f(A)=V(Aj)$; and when $A \geq Am$, $V=f(A)=V(Am)$, where m is the number of sample points of the channel correlation range and V is the value of the speed function.

(3) The Channel Correlation Function

For each speed sample point Vi, the minimum correlation $A(Vi)$ when the data transmission throughput in the closed-loop mode is higher than the data transmission throughput in the open-loop mode is obtained, so as to obtain a group of discrete points $(Vi, A(Vi))$. The channel correlation function is that: when $V=V1=0$, $A=f(V)=A(V1)$; and when $Vi-1<V \leq Vi$, and $i \in [2, n]$, $A=f(V)=A(Vi)$, where n is the number of sample points of the speed range and A is the value of the channel correlation function.

This embodiment provides methods for determining the speed threshold, the channel correlation threshold, the speed function and the channel correlation function by using a computer simulation technology. In the method, values in the speed range and values in the channel correlation range are taken at intervals as the sample points respectively, the speed range and the channel correlation range, and interval spacing may be flexibly controlled according to application requirements, the smaller the interval is, the more accurate the speed threshold, the channel correlation threshold, the speed function and the channel correlation function are, and at the same time, the larger the workload of simulation is, and the higher the requirements for the measurement accuracy of the speed and the channel correlation are.

Figure 2:
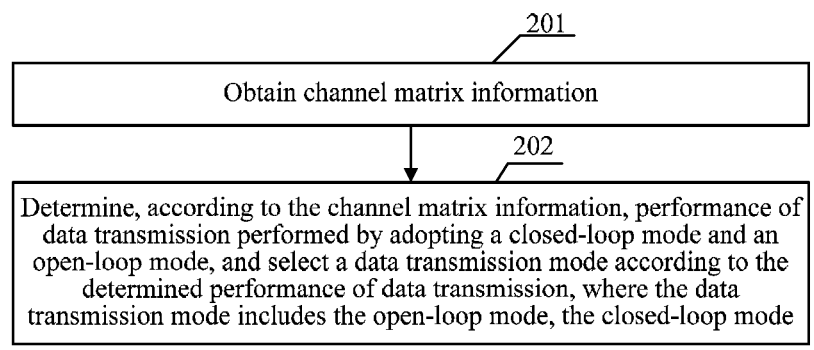
FIG. 2 is a schematic flow chart of another method for configuring a transmission mode according to another embodiment of the present invention.

An embodiment of the present invention also provides another method for configuring a transmission mode, as shown in FIG. 2, including:

201: Obtain channel matrix information, where the channel matrix information is any one of a precoding matrix indicator which most matches a current uplink channel matrix of a terminal, a current downlink precoding matrix indicator of the terminal, an uplink channel matrix of the terminal and the precoding matrix indicator which most matches the current uplink channel matrix of the terminal, and the uplink channel matrix of the terminal and the current downlink precoding matrix indicator of the terminal.

202: Determine, according to the channel matrix information, performance of data transmission performed by adopting a closed-loop mode and an open-loop mode, and select a data transmission mode according to the determined performance of data transmission, where the data transmission mode includes the open-loop mode, the closed-loop mode. After the data transmission mode is selected, the data transmission may be performed according to the selected mode.

In this embodiment, the performance of data transmission performed by adopting the closed-loop mode and the open-loop mode is determined by adopting the channel matrix information, and then the transmission mode is determined according to the performance of transmission, so as to select the transmission mode more accurately, thereby promoting data transmission efficiency.

The following embodiment takes each of the optional several pieces of channel matrix information as an example to illustrate:

(1) If the channel matrix information is the precoding matrix indicator which most matches the current uplink channel matrix of the terminal or the current downlink precoding matrix indicator of the terminal, then in 202, the determining, according to the channel matrix information, the performance of data transmission performed by adopting the closed-loop mode and the open-loop mode, and selecting the data transmission mode according to the determined performance of data transmission, where the data transmission mode includes the open-loop mode, the closed-loop mode, includes:

if a change probability of two adjacent precoding matrix indicators is greater than a preset change probability threshold, selecting the open-loop mode to be the data transmission mode; and/or, if the change probability of two adjacent precoding matrix indicators is smaller than the preset change probability threshold, selecting the closed-loop mode to be the data transmission mode.

More specifically, taking an LTE system as an example, each time when an SRS is sent, an uplink channel matrix H is estimated, and then a precoding matrix indicator (Precoding Matrix Indicator, PMI) most matched with the H is calculated. The change probability of two adjacent PMIs calculated in sequence is counted. Because a PMI may reflect information of channel spatial correlation, the change of two adjacent PMIs may reflect the speed information, the probability may reflect the comprehensive effect of the speed information and the information of channel spatial correlation, and finally reflect the relative performance of the open-loop mode and the closed-loop mode: when the change probability is large, the performance in the open-loop mode is better, and vice versa.

(2) If the channel matrix information is the uplink channel matrix of the terminal and the precoding matrix indicator which most matches the current uplink channel matrix of the terminal, or the uplink channel matrix of the terminal and the current downlink precoding matrix indicator of the terminal, then in 202, the determining, according to the channel matrix information, the performance of data transmission performed by adopting the closed-loop mode and the open-loop mode, and selecting the data transmission mode according to the determined performance of data transmission, where the data transmission mode includes the open-loop mode, the closed-loop mode, includes:

Evaluating, according to the channel matrix information, the Shannon capacity reached by the closed-loop mode and the Shannon capacity reached by the open-loop mode; and if the Shannon capacity reached by the closed-loop mode is greater than the Shannon capacity reached by the open-loop mode, selecting the closed-loop mode to be the data transmission mode; and/or if the Shannon capacity reached by the open-loop mode is greater than the Shannon capacity reached by the closed-loop mode, selecting the open-loop mode to be the data transmission mode.

More specifically, taking the LTE system as an example, each time when an SRS is sent, an uplink channel matrix H is estimated, in one aspect, according to the H, a PMI most matched with the H may be calculated, and further the Shannon capacity that may be reached by the closed-loop transmission mode may be evaluated; in another aspect, the Shannon capacity that may be reached by the open-loop transmission mode may also be directly evaluated according to the H. In this way, the relative performance of the open-loop mode and the closed-loop mode may be obtained.

(3) If the channel matrix information is the uplink channel matrix of the terminal and the precoding matrix indicator which most matches the current uplink channel matrix of the terminal, or the uplink channel matrix of the terminal and the current downlink precoding matrix indicator of the terminal, then in 202, the determining, according to the channel matrix information, the performance of data transmission performed by adopting the closed-loop mode and the open-loop mode, and selecting the data transmission mode according to the determined performance of data transmission, where the data transmission mode includes the open-loop mode and the closed-loop mode, includes:

Evaluating, according to the channel matrix information, the signal-to-noise ratio after equalization reached by the closed-loop mode and the signal-to-noise ratio after equalization reached by the open-loop mode; and if the signal-to-noise ratio after equalization reached by the closed-loop mode is greater than the signal-to-noise ratio after equalization reached by the open-loop mode, selecting the closed-loop mode to be the data transmission mode; and/or if the signal-to-noise ratio after equalization reached by the open-loop mode is greater than the signal-to-noise ratio after equalization reached by the closed-loop mode, selecting the open-loop mode to be the data transmission mode.

The embodiment provides three specific implementation solutions of determining the performance of data transmission performed by adopting the closed-loop mode and the open-loop mode according to the channel matrix information, the performance of data transmission performed by adopting the closed-loop mode and the open-loop mode may be accurately determined, so as to select the transmission mode more accurately, thereby promoting data transmission efficiency.

Figure 3:
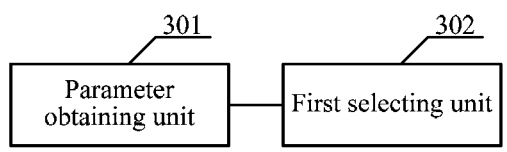
FIG. 3 is a schematic structural diagram of an apparatus for configuring a transmission mode according to another embodiment of the present invention.

An embodiment of the present invention also provides an apparatus for configuring a transmission mode, which may be configured to implement the method provided by the embodiment, and details are not repeated herein again. Important illustration is only made as follows. As shown in FIG. 3, the apparatus includes:

a parameter obtaining unit 301, configured to obtain a measured value and a preset value, where the measured value includes a current movement speed of a terminal and the current channel correlation of the terminal; and a first selecting unit 302, configured to select a data transmission mode according to a result of comparing a measured value and the preset value.

In the embodiment of the present invention, a transmission mode is determined by adopting channel spatial correlation and a speedchannel spatial correlation, so as to select the transmission mode more accurately, thereby promoting data transmission efficiency.

Optionally, if the parameter obtaining unit 301 is configured to obtain the preset value, where the preset value includes a speed threshold and a channel correlation threshold;

the first selecting unit 302 is specifically configured to perform any one of the following: if the current movement speed of the terminal is greater than the speed threshold, and the current channel correlation of the terminal is smaller than the channel correlation threshold, select the open-loop mode to be the data transmission mode; if the current movement speed of the terminal is smaller than the speed threshold or the current channel correlation of the terminal is greater than the channel correlation threshold, select the closed-loop mode to be the data transmission mode.

Optionally, if the parameter obtaining unit 301 is configured to obtain the preset value, where the preset value includes a value of a speed function, where an independent variable of the speed function is channel spatial correlation, and the speed function is a monotone increasing function; the value of the speed function is a function value of the speed function when a value of the independent variable of the speed function is a value of the current channel spatial correlation of the terminal;

the first selecting unit 302 is specifically configured to perform any one of the following: if the current movement speed of the terminal is greater than the value of the speed function, select the open-loop mode to be the data transmission mode; if the current movement speed of the terminal is smaller than the value of the speed function, select the closed-loop mode to be the data transmission mode.

Optionally, if the parameter obtaining unit 301 is configured to obtain the preset value, where the preset value includes a value of a channel correlation function, where an independent variable of the channel correlation function is a movement speed, and the channel correlation function is a monotone increasing function; the value of channel correlation function is a function value of the channel correlation function when a value of the independent variable of the channel correlation function is a value of the current movement speed of the terminal;

the first selecting unit 302 is specifically configured to perform any one of the following: if the current channel spatial correlation of the terminal is smaller than the value of the channel correlation function, select the open-loop mode to be the data transmission mode; if the current channel spatial correlation of the terminal is greater than the value of the channel correlation function, select the closed-loop mode to be the data transmission mode.

An embodiment of the present invention further provides another apparatus for configuring a transmission mode, which may be configured to implement the method provided by the embodiment, and details are not repeated herein again.

Figure 4:
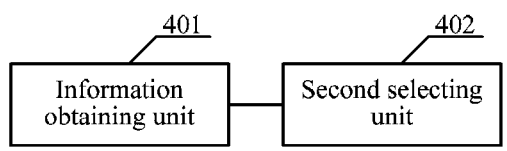
FIG. 4 is a schematic structural diagram of another apparatus for configuring a transmission mode according to another embodiment of the present invention.

Important illustration is only made as follows. As shown in FIG. 4, the apparatus includes:

an information obtaining unit 401, configured to obtain channel matrix information, where the channel matrix information is any one of a precoding matrix indicator which most matches a current uplink channel matrix of a terminal, a current downlink precoding matrix indicator of the terminal, an uplink channel matrix of the terminal and the precoding matrix indicator which most matches the current uplink channel matrix of the terminal, and the uplink channel matrix of the terminal and the current downlink precoding matrix indicator of the terminal; and a second selecting unit 402, configured to determine, according to the channel matrix information, performance of data transmission performed by adopting a closed-loop mode and an open-loop mode, and select a data transmission mode according to the determined performance of data transmission, where the data transmission mode includes the open-loop mode, the closed-loop mode.

In this embodiment, the performance of data transmission performed by adopting the closed-loop mode and the open-loop mode is determined by adopting the channel matrix information, and then the transmission mode is determined according to the performance of transmission, so as to select the transmission mode more accurately, thereby promoting data transmission efficiency.

Optionally, if the channel matrix information is the precoding matrix indicator which most matches the current uplink channel matrix of the terminal or the current downlink precoding matrix indicator of the terminal;

the second selecting unit 402 is specifically configured to perform any one of the following: if a change probability of two adjacent precoding matrix indicators is greater than a preset change probability threshold, select the open-loop mode to be the data transmission mode; if the change probability of two adjacent precoding matrix indicators is smaller than the preset change probability threshold, select the closed-loop mode to be the data transmission mode.

Optionally, if the channel matrix information is the uplink channel matrix of the terminal and the precoding matrix indicator which most matches the current uplink channel matrix of the terminal, or the uplink channel matrix of the terminal and the current downlink precoding matrix indicator of the terminal;

the second selecting unit 402 is specifically configured to evaluate, according to the channel matrix information, the Shannon capacity reached by the closed-loop mode and the Shannon capacity reached by the open-loop mode; and optionally, if the Shannon capacity reached by the closed-loop mode is greater than the Shannon capacity reached by the open-loop mode, select the closed-loop mode to be the data transmission mode; and/or, if the Shannon capacity reached by the open-loop mode is greater than the Shannon capacity reached by the closed-loop mode, select the open-loop mode to be the data transmission mode.

Optionally, if the channel matrix information is the uplink channel matrix of the terminal and the precoding matrix indicator which most matches the current uplink channel matrix of the terminal, or the uplink channel matrix of the terminal and the current downlink precoding matrix indicator of the terminal;

the second selecting unit 402 is specifically configured to evaluate the signal-to-noise ratio after equalization reached by the closed-loop mode and the signal-to-noise ratio after equalization reached by the open-loop mode according to the channel matrix information; and optionally, if the signal-to-noise ratio after equalization reached by the closed-loop mode is greater than the signal-to-noise ratio after equalization reached by the open-loop mode, select the closed-loop mode to be the data transmission mode; and/or, if the signal-to-noise ratio after equalization reached by the open-loop mode is greater than the signal-to-noise ratio after equalization reached by the closed-loop mode, select the open-loop mode to be the data transmission mode.

The embodiment provides three specific implementation solutions of determining, according to the channel matrix information, the performance of data transmission performed by adopting the closed-loop mode and the open-loop mode, the performance of data transmission performed by adopting the closed-loop mode and the open-loop mode may be accurately determined, so as to select the transmission mode more accurately, thereby promoting data transmission efficiency.

Persons of ordinary skill in the art should understand that all or part of the steps of the method in each of the embodiments may be implemented by a program instructing relevant hardware. The program may be stored in a computer readable storage medium. The storage medium may be a read-only memory, a magnetic disk, an optical disk, or the like.

The above description is merely exemplary embodiments of the present invention, but not intended to limit the protection scope of the present invention. Any variation or replacement made by persons skilled in the art within the technical scope disclosed by the present invention shall fall within the protection scope of the present invention. Therefore, the protection scope of the present invention shall be subject to the claims.

What is claimed is:

1. A method for configuring a transmission mode, comprising:
  obtaining channel matrix information, wherein the channel matrix information is any one of the following (a) and (b):
  (a) a precoding matrix indicator, wherein an inner product between a precoding matrix indicated by the precoding matrix indicator and a current uplink channel matrix of a terminal corresponds to a highest value,
  (b) a current downlink precoding matrix indicator of the terminal,
  determining, according to the channel matrix information, performance of data transmission performed by adopting a closed-loop mode and an open-loop mode; and
  selecting a data transmission mode according to the determined performance of the data transmission, wherein the data transmission mode comprises the open-loop mode, the closed-loop mode;
  wherein,
  the determining, according to the channel matrix information, the performance of the data transmission performed by adopting the closed-loop mode and the open-loop mode, and the selecting the data transmission mode according to the determined performance of the data transmission comprises any one of the following (c) and (d):
  (c) if a change probability of two adjacent precoding matrix indicators is greater than a preset change probability threshold, selecting the open-loop mode to be the data transmission mode; and
  (d) if the change probability of two adjacent precoding matrix indicators is smaller than a preset change probability threshold, selecting the closed-loop mode to be the data transmission mode.

2. A method for configuring a transmission mode, comprising:
  obtaining channel matrix information, wherein the channel matrix information is any one of the following (i) and (ii):
  (i) an uplink channel matrix of the terminal and the precoding matrix indicator, wherein an inner product between the uplink channel matrix of the terminal and a precoding matrix indicated by the precoding matrix indicator corresponds to a highest value, and
  (ii) the uplink channel matrix of the terminal and the current downlink precoding matrix indicator of the terminal;
  determining, according to the channel matrix information, performance of data transmission performed by adopting a closed-loop mode and an open-loop mode; and
  selecting a data transmission mode according to the determined performance of the data transmission, wherein the data transmission mode comprises the open-loop mode, the closed-loop mode;
  wherein,
  the determining, according to the channel matrix information, the performance of the data transmission performed by adopting the closed-loop mode and the open-loop mode, and the selecting the data transmission mode according to the determined performance of the data transmission comprises:
  according to the channel matrix information, evaluating a Shannon capacity reached by the closed-loop mode and a Shannon capacity reached by the open-loop mode; and
  implementing one of the following (1) and (2):
  (1) if the Shannon capacity reached by the closed-loop mode is greater than the Shannon capacity reached by the open-loop mode, selecting the closed-loop mode to be the data transmission mode; and
  (2) if the Shannon capacity reached by the open-loop mode is greater than the Shannon capacity reached by the closed-loop mode, selecting the open-loop mode to be the data transmission mode.

3. A method for configuring a transmission mode, comprising:
  obtaining channel matrix information, wherein the channel matrix information is any one of the following (i) and (ii):
  (i) an uplink channel matrix of the terminal and the precoding matrix indicator, wherein an inner product between the uplink channel matrix of the terminal and a precoding matrix indicated by the precoding matrix indicator corresponds to a highest value, and
  (ii) the uplink channel matrix of the terminal and the current downlink precoding matrix indicator of the terminal;
  determining, according to the channel matrix information, performance of data transmission performed by adopting a closed-loop mode and an open-loop mode; and
  selecting a data transmission mode according to the determined performance of the data transmission wherein the data transmission mode comprises the open-loop mode, the closed-loop mode;
  wherein,
  the determining, according to the channel matrix information, the performance of the data transmission performed by adopting the closed-loop mode and the open-loop mode, and the selecting the data transmission mode according to the determined performance of the data transmission comprises:
  evaluating a signal-to-noise ratio after equalization reached by the closed-loop mode and a signal-to-noise ratio after equalization reached by the open-loop mode according to the channel matrix information; and implementing one of the following (a) and (b):

(a) if the signal-to-noise ratio after the equalization reached by the closed-loop mode is greater than the signal-to-noise ratio after the equalization reached by the open-loop mode, selecting the closed-loop mode to be the data transmission mode; and (b) if the signal-to-noise ratio after the equalization reached by the open-loop mode is greater than the signal-to-noise ratio after the equalization reached by the closed-loop mode, selecting the open-loop mode to be the data transmission mode.

4. An apparatus for configuring a transmission mode, comprising:

an information obtaining unit, configured to obtain channel matrix information, wherein the channel matrix information is any one of the following (a) and (b):

(a) a precoding matrix indicator, wherein an inner product between a precoding matrix indicated by the precoding matrix indicator and a current uplink channel matrix of a terminal corresponds to a highest value, (b) a current downlink precoding matrix indicator of the terminal, a second selecting unit, configured to determine, according to the channel matrix information, performance of data transmission performed by adopting a closed-loop mode and an open-loop mode, and select a data transmission mode according to the determined performance of the data transmission, wherein the data transmission mode comprises the wen-loop mode, the closed-loop mode;

wherein, the second selecting unit is configured to perform any one of the following (i) and (ii):

if a change probability of two adjacent precoding matrix indicators is greater than a preset change probability threshold, select the open-loop mode to be the data transmission mode;

if the change probability of two adjacent precoding matrix indicators is smaller than a preset change probability threshold, select the closed-loop mode to be the data transmission mode.

5. An apparatus for configuring a transmission mode, comprising:

an information obtaining unit, configured to obtain channel matrix information, wherein the channel matrix information is any one of the following (i) and (ii):

(i) an uplink channel matrix of the terminal and the precoding matrix indicator, wherein an inner product between the uplink channel matrix of the terminal and a precoding matrix indicated by the precoding matrix indicator corresponds to a highest value, and (ii) the uplink channel matrix of the terminal and the current downlink precoding matrix indicator of the terminal;

a second selecting unit, configured to determine, according to the channel matrix information, performance of data transmission performed by adopting a closed-loop mode and an open-loop mode, and select a data transmission mode according to the determined performance of the data transmission wherein the data transmission mode comprises the wen-loop mode, the closed-loop mode;

wherein, the second selecting unit is configured to evaluate, according to the channel matrix information, a Shannon capacity reached by the closed-loop mode and a Shannon capacity reached by the open-loop mode, and select the data transmission mode according to an evaluation result by implementing one of the following (a) and (b):

(a) if the Shannon capacity reached by the closed-loop mode is greater than the Shannon capacity reached by the open-loop mode, selecting the closed-loop mode to be the data transmission mode; and (b) if the Shannon capacity reached by the open-loop mode is greater than the Shannon capacity reached by the closed-loop mode, selecting the open-loop mode to be the data transmission mode.

6. An apparatus for configuring a transmission mode, comprising:

an information obtaining unit, configured to obtain channel matrix information, wherein the channel matrix information is any one of the following (i) and (ii):

(i) an uplink channel matrix of the terminal and the precoding matrix indicator, wherein an inner product between the uplink channel matrix of the terminal and a precoding matrix indicated by the precoding matrix indicator corresponds to a highest value, and (ii) the uplink channel matrix of the terminal and the current downlink precoding matrix indicator of the terminal;

a second selecting unit, configured to determine, according to the channel matrix information, performance of data transmission performed by adopting a closed-loop mode and an open-loop mode, and select a data transmission mode according to the determined performance of the data transmission, wherein the data transmission mode comprises the wen-loop mode, the closed-loop mode;

wherein, the second selecting unit is configured to evaluate a signal-to-noise ratio after equalization reached by the closed-loop mode and a signal-to-noise ratio after equalization reached by the open-loop mode according to the channel matrix information, and select the data transmission mode according to an evaluation result by implementing one of the following (1) and (2):

(1) if the signal-to-noise ratio after the equalization reached by the closed-loop mode is greater than the signal-to-noise ratio after the equalization reached by the open-loop mode, selecting the closed-loop mode to be the data transmission mode; and (2) if the signal-to-noise ratio after the equalization reached by the open-loop mode is greater than the signal-to-noise ratio after the equalization reached by the closed-loop mode, selecting the open-loop mode to be the data transmission mode.

7. A method for configuring a transmission mode, comprising:

obtaining a measured value and a preset value, wherein the measured value comprises: a current movement speed of a terminal and current channel correlation of the terminal; and selecting a data transmission mode according to a result of comparing the measured value and the preset value, wherein the data transmission mode comprises an open-loop mode or a closed-loop mode;

wherein the preset value is a speed threshold and a channel correlation threshold;

the selecting the data transmission mode according to the result of comparing the measured value and the preset value comprises any one of the following (a) and (b):

(a) if the current movement speed of the terminal is greater than the speed threshold, and the current channel correlation of the terminal is smaller than the channel correlation threshold, selecting the open-loop mode to be the data transmission mode; and (b) if the current movement speed of the terminal is smaller than the speed threshold, or the current channel correlation of the terminal is greater than the channel correlation threshold, selecting the closed-loop mode to be the data transmission mode;

wherein the method further comprises determining the speed threshold and the channel correlation threshold;

wherein the determining the speed threshold and the channel correlation threshold comprises:

taking values in a speed range and values in a channel correlation range at intervals as sample points respectively, and obtaining data transmission throughput in the closed-loop mode corresponding to each sample point and data transmission throughput in the open loop mode corresponding to the each sample point, through simulation;

wherein the speed threshold is a speed value corresponding to a maximum speed sample point, when data transmission throughput in the closed-loop mode corresponding to all sample points in the channel correlation range is respectively greater than data transmission throughput in the open-loop mode corresponding to all the sample points in the channel correlation range; and the channel correlation threshold is channel correlation corresponding to a minimum correlation sample point, when data transmission throughput in the closed-loop mode corresponding to all sample points in the speed range is respectively greater than data transmission throughput in the open-loop mode corresponding to all the sample points in the speed range.

8. A method for configuring a transmission mode, comprising:

obtaining a measured value and a preset value, wherein the measured value comprises: a current movement speed of a terminal and current channel correlation of the terminal; and selecting a data transmission mode according to a result of comparing the measured value and the preset value, wherein the data transmission mode comprises an open-loop mode or a closed-loop mode;

wherein the preset value is a value of a speed function; an independent variable of the speed function is channel spatial correlation, and the speed function is a monotone increasing function; the value of the speed function is a function value of the speed function when a value of the independent variable is a value of current channel spatial correlation of the terminal;

the selecting the data transmission mode according to the result of comparing the measured value and the preset value comprises any one of the following (a) and (b):

(a) if the current movement speed of the terminal is greater than the value of the speed function, selecting the open-loop mode to be the data transmission mode; and (b) if the current movement speed of the terminal is smaller than the value of the speed function, selecting the closed-loop mode to be the data transmission mode.

9. The method according to claim 8, further comprising determining the speed function;

wherein the determining the speed function comprises:

taking values in a speed range and values in a channel correlation range at intervals as sample points respectively, and obtaining data transmission throughput, in the closed-loop mode corresponding to each sample point and data transmission throughput in the open-loop mode corresponding to the each sample point, through simulation; and for each sample point Aj of the channel correlation range, obtaining a maximum speed $V(Aj)$ when the data transmission throughput in the closed-loop mode is higher than the data transmission throughput in the open-loop mode, to obtain a group of discrete points $(Aj, V(Aj))$, wherein the speed function is:

when $Aj \leq A < Aj+1$ and $j \in [1, m]$, $V=f(A)=V(Aj)$; and when $A \geq Am$, $V=f(A)=V(Am)$, wherein m is a quantity of the sample points of the channel correlation range, and V is the value of the speed function.

10. A method for configuring a transmission mode, comprising:

obtaining a measured value and a preset value, wherein the measured value comprises: a current movement speed of a terminal and current channel correlation of the terminal; and selecting a data transmission mode according to a result of comparing the measured value and the preset value, wherein the data transmission mode comprises an open-loop mode or a closed-loop mode;

wherein the preset value is a value of a channel correlation function, an independent variable of the channel correlation function is a movement speed, and the channel correlation function is a monotone increasing function; the value of the channel correlation function is a function value of the channel correlation function when a value of the independent variable is a value of the current movement speed of the terminal;

the selecting the data transmission mode according to the result of comparing the measured value and the preset value comprises any one of the following (a) and (b):

(a) if the current channel correlation of the terminal is smaller than the value of the channel correlation function, selecting the open-loop mode to be the data transmission mode; and (b) if the current channel correlation of the terminal is greater than the value of the channel correlation function, selecting the closed-loop mode to be the data transmission mode.

11. The method according to claim 10, further comprising determining the channel correlation function;

wherein the determining the channel correlation function comprises:

taking values in a speed range and values in a channel correlation range at intervals as sample points respectively, and obtaining data transmission throughput in the closed-loop mode corresponding to each sample point and data transmission throughput in the open-loop mode corresponding to the each sample point, through simulation; and for each speed sample point Vi, obtaining minimum correlation $A(Vi)$ when the data transmission throughput in the closed-loop mode is higher than the data transmission throughput in the open-loop mode, to obtain a group of discrete points $(Vi, A(Vi))$, wherein the channel correlation function is:

when $V=V1=0$, $A=f(V)=A(V1)$; and when $Vi-1<V \leq Vi$, and $i \in [2, n]$, $A=f(V)=A(Vi)$, wherein n is a quantity of the sample points of the speed range and A is the value of the channel correlation function.

12. An apparatus for configuring a transmission mode, comprising:

a parameter obtaining unit, configured to obtain a measured value and a preset value, wherein the measured value comprises: a current movement speed of a terminal and current channel correlation of the terminal; and
a first selecting unit, configured to select a data transmission mode according to a result of comparing the measured value and the preset value, wherein the data transmission mode comprises an open-loop mode, or a closed-loop mode;
wherein
the preset value comprises a value of a speed function, wherein an independent variable of the speed function is channel spatial correlation, and the speed function is a monotone increasing function; the value of the speed function is a function value of the speed function when a value of the independent variable is a value of the current channel spatial correlation of the terminal;
the first selecting unit is configured to perform any one of the following (a) and (b):
(a) if the current movement speed of the terminal is greater than the value of the speed function, selecting the open-loop mode to be the data transmission mode; and
(b) if the current movement speed of the terminal is smaller than the value of the speed function, selecting the closed-loop mode to be the data transmission mode.

13. The apparatus according to claim 12, wherein the speed function is obtained in the following manner:
taking values in a speed range and values in a channel correlation range at intervals as sample points respectively, and obtaining data transmission throughput, in the closed-loop mode corresponding to each sample point and data transmission throughput in the open-loop mode corresponding to the each sample point, through simulation; and
for each sample point $Aj$ of the channel correlation range, obtaining a maximum speed $V(Aj)$ when the data transmission throughput in the closed-loop mode is higher than the data transmission throughput in the open-loop mode, to obtain a group of discrete points $(Aj, V(Aj))$, wherein the speed function is:
when $Aj \leq A < Aj+1$ and $j \epsilon [1, m]$, $V=f(A)=V(Aj)$; and when $A \geq Am$, $V=f(A)=V(Am)$, wherein m is a quantity of the sample points of the channel correlation range, and V is the value of the speed function.

14. An apparatus for configuring a transmission mode, comprising:
a parameter obtaining unit, configured to obtain a measured value and a preset value, wherein the measured value comprises: a current movement speed of a terminal and current channel correlation of the terminal; and
a first selecting unit, configured to select a data transmission mode according to a result of comparing the measured value and the preset value, wherein the data transmission mode comprises an open-loop mode, or a closed-loop mode;
wherein
the preset value comprises a value of a channel correlation function, wherein an independent variable of the channel correlation function is a movement speed, and the channel correlation function is a monotone increasing function; the value of channel correlation function is a function value of the channel correlation function when a value of the independent variable is a value of the current movement speed of the terminal;
the first selecting unit is configured to perform any one of the following (a) and (b):

(a) if the current channel correlation of the terminal is smaller than the value of the channel correlation function, selecting the open-loop mode to be the data transmission mode; and
(b) if the current channel correlation of the terminal is greater than the value of the channel correlation function, selecting the closed-loop mode to be the data transmission mode.

15. The apparatus according to claim 14, wherein the channel correlation function is obtained in the following manner:
taking values in a speed range and values in a channel correlation range at intervals as sample points respectively, and obtaining data transmission throughput in the closed-loop mode corresponding to each sample point and data transmission throughput in the open-loop mode corresponding to the each sample point, through simulation; and
for each speed sample point $Vi$, obtaining minimum correlation $A(Vi)$ when the data transmission throughput in the closed-loop mode is higher than the data transmission throughput in the open-loop mode, to obtain a group of discrete points $(Vi, A(Vi))$, wherein the channel correlation function is:
when $V=V1=0$, $A=f(V)=A(V1)$; and when $Vi-1<V \leq Vi$, and $i \epsilon [2, n]$, $A=f(V)=A(Vi)$, wherein n is a quantity of the sample points of the speed range and A is the value of the channel correlation function.

16. An apparatus for configuring a transmission mode, comprising:
a parameter obtaining unit, that obtains a measured value comprising a current movement speed of a terminal, a current channel correlation of the terminal, and a preset value comprising a speed threshold and a channel correlation threshold, wherein the parameter obtaining unit takes values in a speed range and values in a channel correlation range at intervals as sample points respectively, and the parameter obtaining unit obtains a data transmission throughput in the closed-loop mode corresponding to each sample point and data transmission throughput in the open loop mode corresponding to the each sample point through simulation; and
a first selecting unit that selects a data transmission mode according to a result of comparing the measured value and the preset value, wherein the data transmission mode comprises an open-loop mode, or a closed-loop mode; wherein if the current movement speed of the terminal is greater than the speed threshold, and the current channel correlation of the terminal is smaller than the channel correlation threshold, the selecting unit sets the open-loop mode to be the data transmission mode and if the current movement speed of the terminal is smaller than the speed threshold, or the current channel correlation of the terminal is greater than the channel correlation threshold, the selecting unit sets the closed-loop mode to be the data transmission mode;
wherein the speed threshold is a speed value corresponding to a maximum speed sample point, when data transmission throughput in the closed-loop mode corresponding to all sample points in the channel correlation range is respectively greater than data transmission throughput in the open-loop mode corresponding to all the sample points in the channel correlation range and the channel correlation threshold is channel correlation corresponding to a minimum correlation sample point, when data transmission throughput in the closed-loop mode corresponding to all sample points in the speed range is respectively greater than data transmission throughput in the open-loop mode corresponding to all the sample points in the speed range.

* * * * *

UNITED STATES PATENT AND TRADEMARK OFFICE
CERTIFICATE OF CORRECTION

PATENT NO.      : 9,197,301 B2                           Page 1 of 1
APPLICATION NO. : 14/306921
DATED           : November 24, 2015
INVENTOR(S)     : Zhu et al.

It is certified that error appears in the above-identified patent and that said Letters Patent is hereby corrected as shown below:

In The Claims

Column 13, line 31, "wen-loop" should read -- open-loop --.

Column 13, line 62, "wen-loop" should read -- open-loop --.

Column 14, line 31, "wen-loop" should read -- open-loop --.

Signed and Sealed this
Twenty-second Day of March, 2016

Michelle K. Lee
*Director of the United States Patent and Trademark Office*